3,060,221
PENTAERYTHRITOL ESTERS
Telfer L. Thomas, East Greenbush, N.Y., assignor to General Aniline & Film Corporation, New York, N.Y., a corporation of Delaware
No Drawing. Filed Mar. 20, 1961, Ser. No. 96,652
6 Claims. (Cl. 260—471)

This invention relates to novel pentaerythritol esters which are useful as intermedites for the production of azo dyestuffs, and to a method for their preparation.

The novel compounds of this invention are aminobenzoic esters of pentaerythritol in which 1 to 4 of the hydroxyl groups of pentaerythritol are esterified with aminobenzoic acid, and in which the amino group occupies one of the positions meta and para to the esterified carboxyl group of the aminobenzoic acid radical.

Also within the scope of the invention are the corresponding nitrobenzoic acid esters of pentaerythritol, which constitute intermediates for the aforesaid aminobenzoic acid esters.

The novel amino and nitrobenzoic acid esters of the invention may be represented respectively by the following general formulas:

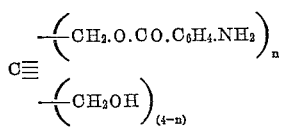

and

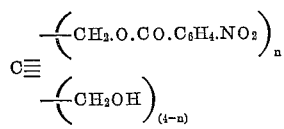

wherein $n$ represents an integer from 1 to 4, and the amino and nitro groups are in one of the positions meta and para to the —CO.O.CH$_2$— group.

Preparation of the novel compounds of this invention is advantageously effected by mixing from 1 to 4 mols of meta or para nitrobenzoyl chloride or bromide with 1 mol of pentaerythritol and an excess of acid binding agent in an otherwise non-reactive solvent reaction medium. Tertiary nitrogen bases are especially advantageous, serving not only as acid binding agents but also as otherwise unreactive solvent media. Such bases are, for example, pyridine, methylpyridines, N-methyl piperidine, trimethylamine and the like. Alterntively inert solvents such as N-methylpyrrolidone or N,N-dimethyl formamide can be employed, together with an alkli—or alkline earth—metal carbonate as the acid binding agent.

The solvent medium is preferably used in an mount 5 to 25 times the amount by weight of pentaerythritol, and the acid binding agent—if other than the solvent medium—can be used in amounts from 1½ to 2½ times the stoichiometric equivalent of the nitrobenzoyl halide employed as the esterifying reagent.

The esterification mixture is preferably heated at temperatures up to its boiling point, preferably however within the range of 75 to 125° C. Residual water, if present, can be removed by distillation with an initial fraction of the solvent. Esterification is ordinarily complete in 3 to 6 hours.

The nitorbenzoic acid pentaerythritol ester contained in the reaction mixture can be recovered by filtering, evaporating the solvent and recrystallizing from alcohol. However, the separation of the nitrobenzoic acid ester from the esterification mixture is unnecessary if it is to be converted to the corresponding aminobenzoic acid ester. For this purpose, a reducing agent is advantageously added to the completed esterification mixture, preferably an alkali metal hydrosulfide. The latter is advantageously dissolved in alcohol (ethanol, methanol) and added to the esterification mixture in an amount somewhat in excess of the quantity required for reduction of the nitro groups of the nitrobenzoic acid ester. For example, about 1½ to 2 parts by weight of sodium hydrosulfide is appropriately employed for each part by weight of nitrobenzoyl chloride used in the esterification. The quantity of alcohol thus employed is appropriately 2 to 4 times the weight of the alkali metal hydrosulfide.

After addition of the alkali metal hydrosulfide solution, the resulting mixture is heated under reflux for 3 to 6 hours, cooled and filtered. The solvents contained therein are removed by distillation, and water is added to the residue, together with sufficient strong mineral acid (e.g. hydrochloric acid) to render the aqueous solution acid to Congo red. Upon evaporation, the aminobenzoic acid-pentaerythritol ester is recovered in the form of its mineral acid salt, which crystallizes from the concentrated aqueous solution.

The free aminobenzoic acid ester can be liberated from the mineral acid salt by treatment with a stoichiometric equivalent of an acid binding agent such as sodium bicarbonate, calcium carbonate or the like, or in the case of the hydrochloride, by treatment with silver oxide and separation of the insoluble silver compounds from the water-soluble aminobenzoic acid pentaerythritol ester.

My invention will be more fully understood from the following examples wherein parts and percentages are by weight unless otherwise indicated.

*Example 1*

To 215 parts of mixed picolines are added 20 parts of pentaerythritol. About 24 parts of the solvent is distilled off in order to remove residual water present in the mixture. 54.6 parts of meta-nitrobenzoyl chloride are added with agitation, and the mixture is heated at about 100° C. for 4 hours. A solution of 75 parts of sodium hydrosulfide in 200 parts of ethanol is gradually added over a period of 30 minutes to the resulting solution of pentaerythritol di-(meta-nitrobenzoate). The mixture is then heated at 90 to 100° C. with agitation, for 4 hours, cooled to 35 to 40° C. and filtered. Alcohol and picolines are removed by distillation, and 200 parts of water are added to the residue. The resulting solution is acidified to Congo red with hydrochloric acid, allowed to stand for about 4 hours and then filtered. Upon evaporation of the filtrate, pentaerythritol di-(meta-aminobenzoate) separates as a hydrochloride in the form of light brownish-yellow crystals.

Isolation of free pentaerythritol di-(meta-aminobenzoate) can be effected by adding a slight excess of silver oxide to the aqueous solution of the hydrochloride, filtering out the silver compounds, and evaporating the filtrate. However, in the event the product is to be used in the preparation of azo dyestuffs, it is not necessary to liberate the free aminobenzoic ester from its hydrochloride.

*Example 2*

Pentaerythritol di-(para-nitrobenzoate) and pentaerythritol di-(para-aminobenzoate) are prepared in the same manner as the corresponding meta-nitro and meta-aminobenzoates of Example 1, except that 54.6 grams of para-nitrobenzoyl chloride is substituted for the same amount of the corresponding meta compound of Example 1. The products obtained are similar in their properties to the corresponding products of Example 1.

*Example 3*

Pentaerythritol mono-(meta-nitrobenzoate) and pentaerythritol mono-(meta-aminobenzoate) are produced by the same procedure as that of Example 1 except that 28 parts of meta-nitrobenzoyl chloride is employed instead of 54.6 parts, and 40 parts of sodium hydrosulfide dissolved in 140 parts of ethanol are used instead of a solution of 75 parts of this reagent in 200 parts of ethanol.

*Example 4*

Pentaerythritol tris-(meta-nitrobenzoate) and pentaerythritol tris-(meta-aminobenzoate) are produced by the procedure of Example 1, except that 84 parts of meta-nitrobenzoyl chloride are substituted for 54.6 parts employed in the aforesaid example, and a solution of 115 parts of sodium hydrosulfide in 300 parts of ethanol instead of the quantity indicated in Example 1.

*Example 5*

Pentaerythritol tetra-(meta-nitrobenzoate) and pentaerythritol tetra-(meta-aminobenzoate) are produced in the same manner as described for the products of Example 1, except that instead of 54.6 parts, 110 parts of meta-nitrobenzoyl chloride are employed in the esterification, and in the subsequent reduction of the resulting nitrobenzoic acid ester, 150 parts of sodium hydrosulfide ($NaH_5.2H_2O$) dissolved in 320 parts of ethanol (rather than 75 parts of sodium hydrosulfide in 200 parts of ethanol) are employed. The tetra nitrobenzoic acid ester and the corresponding aminobenzoic ester can be recovered in the same manner indicated for the products of Example 1.

In the foregoing examples in which meta-nitrobenzoyl chloride is employed, substitution of an equal amount of para-nitrobenzoyl chloride yields the corresponding para-nitro and para-amino benzoic acid esters. Meta and para nitrobenzoyl bromides can be used if desired in place of the chlorides, chemically equivalent quantities being used. The meta and para-nitrobenzoic acid esters of the invention are essentially similar in their properties, as are also the meta- and para-aminobenzoic acid esters, the latter yielding similar dyestuffs upon diazotization and coupling with an azo coupling component.

The amino benzoic acid esters of this invention can be converted to azo dyestuffs without isolating them from the reaction mixture in which they are prepared. The solution containing the mineral acid salt e.g. the hydrochloride of the aminobenzoic acid esters of the invention can be diazotized by addition of nitrite, and the resulting diazo compound coupled with an appropriate azo dyestuff coupling component. Azo dyestuffs are thus obtained which yield valuable colorations, especially on polyacrylonitrile fibre. Such dyestuffs are the subject of my co-pending application Serial No. 96,690 filed as of even date herewith.

Variations and modifications, which will be obvious to those skilled in the art, can be made in the procedures hereinabove described and illustrated without departing from the scope or spirit of the invention.

I claim:

1. Aminobenzoic acid esters of pentaerythritol in which 1 to 4 of the hydroxyl groups of pentaerythritol are esterified with aminobenzoic acid wherein the amino group occupies one of the positions meta and para to the carboxy-ester group.
2. Pentaerythritol di-(meta-aminobenzoate).
3. Pentaerythritol di-(para-aminobenzoate).
4. Pentaerythritol mono-(meta-aminobenzoate).
5. Pentaerythritol tris-(meta-aminobenzoate).
6. Pentaerythritol tetra-(meta-aminobenzoate).

References Cited in the file of this patent

Berlow et al.: The Pentaerythritols (New York, 1958), p. 218.